No. 876,759. PATENTED JAN. 14, 1908.
J. B. YOUNG.
COON AND MINK TRAP.
APPLICATION FILED MAY 10, 1907.
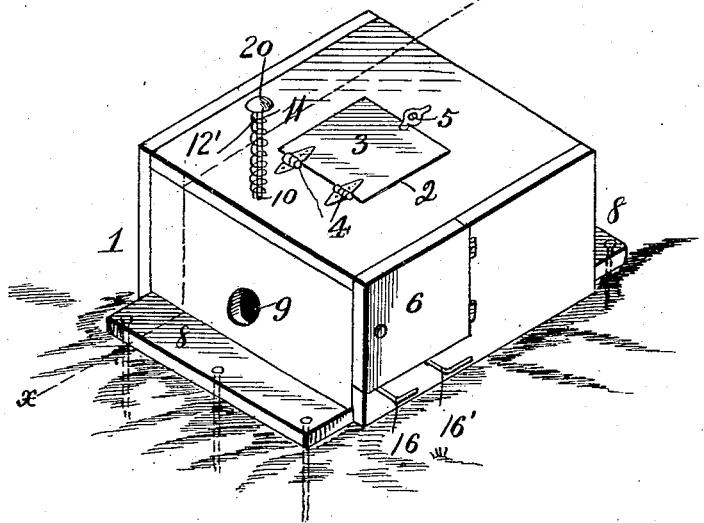
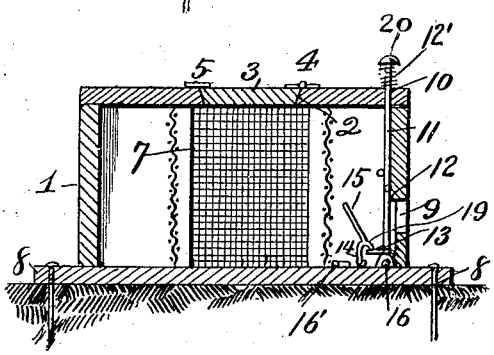
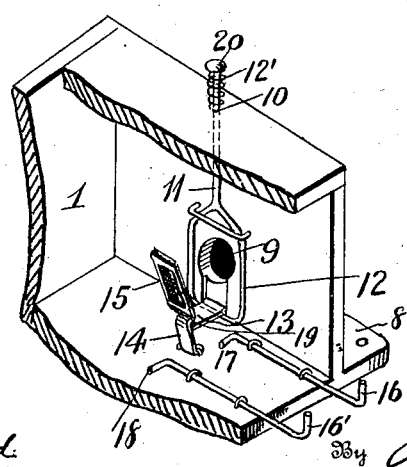
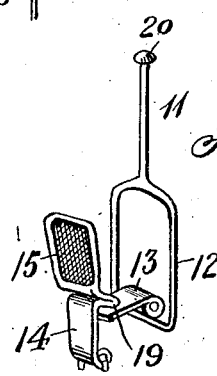
Witnesses
F. L. Ourand
P. E. Trott
Inventor
J. B. Young
By John S. Duffie
Attorney

UNITED STATES PATENT OFFICE.

JOHN B. YOUNG, OF HALLIDAY, ARKANSAS.

COON AND MINK TRAP.

No. 876,759.  Specification of Letters Patent.  Patented Jan. 14, 1908.

Application filed May 10, 1907. Serial No. 372,934.

*To all whom it may concern:*

Be it known that I, JOHN B. YOUNG, a citizen of the United States, residing at Halliday, in the county of Greene and State of Arkansas, have invented certain new and useful Improvements in Coon and Mink Traps, of which the following is a specification.

My invention is a coon and mink trap, but may be used for the capture of any small animals of that class.

It consists substantially of a box, having an inner cage composed of gauze wire, an opening and door in the top, an entrance opening in the side or end, with a spring yoke and a trigger for setting off the trap.

In the accompanying sheet of drawing, Figure 1, is a perspective view of my invention. Fig. 2, is a cross sectional vertical view of Fig. 1, on the line $x\,x$, looking from the rear side of the box. Fig. 3, is a perspective view of the trigger and spring mechanism, a sufficient part of the box being broken away to show said mechanism. Fig. 4, is a detail view, showing the yoke and trigger mechanism.

My invention is described as follows:—

Numeral 1, represents the box; 2, an opening in the top of said box; 3, the door; 4, the hinges; 5, the button. In one side of the box is another hinged door 6, that the operator may gain access to the trigger mechanism. On the inside of the box is a wire gauze basket 7; this basket is just as high as the box is deep, but not so large, the opening 2, is immediately over the top of this basket so that live chickens, or other bait, may be let down through this opening into the basket. The bottom of the box extends outwardly from each end thereof, forming perforated flanges 8, by means of which the box may be secured in place. In one end of the box is a hole 9, through which the mink, coon or other animal is supposed to thrust his head to get the bait. In the top of the box, immediately over said hole 9, is a perforation 10, and extending upwardly through said perforation is a rod 11, and to the lower end of said rod 11, is secured a yoke 12; this rod works up and down on the inside of the box and immediately over the hole 9, so that when it flies up the yoke catches the animal around the neck and chokes it to death.

Secured to the top of the box, and working around rod 11, is a spiral spring $12^1$, which causes the rod 11 and yoke 12, to fly upwardly when the yoke is released. Hinged to the inner face of the wall of the box, and immediately under the hole 9, is a lock-bar 13, and immediately to the rear of said lock-bar is a hinged trigger 14, the upper end of which is a frame filled with a wire gauze 15, so that when the animal comes to the hole 9, he can look through at, and smell the bait secured in the gauze basket, and when he puts his head through the opening and touches the trigger, the lock-bar is immediately released, the yoke flies up and the animal is caught and securely held. As the spring 12, must be reasonably strong, and as it would not be entirely safe always to thrust the hand inside of the door 6, I have provided two double crank hinged levers, 16 and $16^1$, to set the trap. In setting the trap, the lever 16, is pushed in under the lock-bar, and then the arm 17, is turned up, which turns the lock-bar up, the yoke 12, is pushed down and then the lever 16, is partly withdrawn and the lock-bar drops of its own weight over the lower part of the yoke; then the arm 18, of the lever $16^1$, is turned up, which turns up the free end of the trigger 14, the extension arm 19, of which passes over the free end of said lock-bar and locks it, and the trap is set. During the operation of setting the trap, the yoke may be held down by placing a weight of some kind on the head 20, of the rod 11.

I have shown only one hole, one yoke and one trigger mechanism, but I may have a hole and a trigger mechanism in each end and both sides of the box, that I may, at one setting, catch as many as four animals.

Although I have specifically described the combination, construction and arrangement of the several parts of my invention, I do not confine myself particularly to such specific combination, construction and arrangement, as I claim the right to make such changes and modification therein as may clearly fall within the scope of my invention, and which may be resorted to without departing from the spirit, or sacrificing any of my patentable rights therein.

Having described my invention, what I claim as new and desire to secure by Letters Patent, is:—

1. A mink and coon trap, consisting of a box 1, substantially square, having an opening 2, and a door 3, and a perforation 10, in its top, and an opening and door in one of its sides and a hole 9, in one of its ends; a wire gauze basket seated in the center of said box, immediately under the door 3; a rod 11, passing up through said perforation, having on its upper end a head 20; a spiral spring $12^1$, working around said rod, and between said head 20, and the top, of the box; a yoke 12, secured to the lower end of said rod, and adapted to work up and down immediately in front of the hole 9; a lock-bar 13, hinged immediately under the hole 9; a trigger 14, hinged immediately to the rear of said lock-bar, and adapted to be raised and lock said bar; a double crank lever, having an arm 17, adapted to raise the free end of said lock-bar, and a lever $16^1$, having an arm 18, adapted to raise the free end of the trigger 14, substantially as shown and described, and for the purposes set forth.

2. The combination of a box, provided with door openings permitting ingress to and egress from said box, a hole in the wall of said box and a perforation in the top thereof a wire gauze basket, situated on the inside of said box; a yoke, working up and down on the inside of said box, immediately in rear of said hole, carrying on its upper end a rod, which passes up through a perforation in the top of said box; said head, secured on the upper end of said rod; a spiral spring, working around said rod and between said head and the top of the box, and trigger mechanism, consisting of a lock-bar and a trigger, said spring adapted to throw said loop up when said trigger is thrown, substantially as shown and described, and for the purposes set forth.

3. The combination of a box, provided with top and side openings, to permit ingress to and egress from said box; a hole in the wall of said box and a perforation in the top thereof; a yoke, working on the inside of said box and immediately in the rear of said hole, and having a rod extending up through the perforation in said box; a trigger mechanism having a lock-bar hinged immediately under said hole and adapted to work over the lower part of said loop and hold said loop down; a trigger, hinged immediately to the rear of said lock-bar and adapted to hold the free end of the same down, with means for throwing said loop up when the trigger mechanism is released, substantially as shown and described, and for the purposes set forth.

In testimony whereof I affix my signature, in presence of two witnesses.

JOHN B. YOUNG.

Witnesses:
I. L. JAMES,
R. J. JACKSON.